United States Patent [19]

Carlson

[11] 4,135,148

[45] Jan. 16, 1979

[54] CHARACTER PRESENCE DETECTOR

[75] Inventor: Clifford H. Carlson, Fort Worth, Tex.

[73] Assignee: Recognition Equipment Incorporated, Irving, Tex.

[21] Appl. No.: 913,724

[22] Filed: Jun. 7, 1978

[51] Int. Cl.$^2$ .............................................. G06K 9/12
[52] U.S. Cl. ............................................ 340/146.3 H
[58] Field of Search ............. 340/146.3 H, 146.3 AG, 340/146.3 MA, 146.3 AC, 146.3 V; 358/282, 288

[56] References Cited

U.S. PATENT DOCUMENTS

| | | | |
|---|---|---|---|
| 3,407,386 | 10/1968 | Spanjersberg | 340/146.3 H |
| 3,585,591 | 6/1971 | Hauff | 340/146.3 H |
| 3,613,080 | 10/1971 | Angeloni et al. | 340/146.3 AC |
| 3,613,081 | 10/1971 | Morimoto | 340/146.3 H |
| 3,717,848 | 2/1973 | Irvin et al. | 340/146.3 MA |
| 3,883,848 | 5/1975 | Minck et al. | 340/146.3 H |
| 4,034,343 | 7/1977 | Wilmer | 340/146.3 H |

OTHER PUBLICATIONS

Rohland, "Dynamic Scan Centering", *IBM Tech Disclosure Bulletin*, vol. 9, No. 1, Jun. 1966, pp. 62–63.

*Primary Examiner*—Leo H. Boudreau
*Attorney, Agent, or Firm*—John E. Vandigriff; Thomas W. DeMond

[57] ABSTRACT

A character presence detector providing a decision on character presence at the data rate, that is the rate at which the character presence detector receives binary data bits. The binary data bits correspond to the output of a self-scanning photocell array and each data bit corresponds to the output of one of the cells of the array. The binary data bits comprise a binary stream which contains information representing characters on a written medium. The stream of binary data bits which is divided into scans corresponding to scans of the photocell array, is received by a memory within the character presence detector. Each binary bit has a unique position within its particular scan. The memory provides as outputs the data bits corresponding to a certain position within each of the scans within the memory simultaneously. Each position within the scans is sequentially selected as the output of the memory. A set of logic devices is connected to receive the data bits provided by the memory and to signal when the data bits having the same position within two adjacent scans contain character information. The output of all logic devices is summed and this sum is transferred to a storage device. The memory also provides outputs of a certain number of binary data bits adjacent within the binary stream to each of a plurality of sets of logic devices. Each set of logic devices of the plurality of logic devices signals when adjacent binary bits contain character information. The output of the plurality of logic devices and the storage device are connected to a column pattern generator and a row pattern generator, respectively. When both the row pattern generator and the column pattern generator indicate the presence of a character, the location of the character is provided to the remainder of the character recognition system.

23 Claims, 4 Drawing Figures

CHARACTER PRESENCE DETECTOR

BACKGROUND OF THE INVENTION

1. Field of the Invention

The invention relates to character presence detectors within character recognition units; and, more particularly, to character presence detectors which provide character decisions at the data rate with one character decision each time a new binary bit of video data is received.

2. Brief Description of the Prior Art

Reference is made to the U.S. Pat. No. 3,883,843 issued to Minck et al. on May 13, 1975 and entitled "Method of and Circuit Arrangement for Centering a Character". The Minck patent shows and describes a centering apparatus which searches for a particular character information and background information distribution within a matrix memory. The occurrence (and non-occurrence) of the distribution is utilized to locate the center of a character in a particular font, OCR—A. The occurrences (and non-occurrences) are utilized to detect where lines which are orientated in a particular direction, are located. This information is utilized to locate the center of the character. The video is filtered by a conjunctive circuit to aid in locating the lines by altering the character and background information distribution. The center located is in a particular centering direction determined by the particular distribution utilized.

None of the prior constructions known in the art shows a character presence detector which is capable of detecting characters within a serial binary data stream without any information concerning the relative location of the characters or lines of characters within the video.

SUMMARY OF THE INVENTION

The character presence detector disclosed herein receives a stream of binary data. Each binary data bit represents character information or background information which corresponds to characters upon a written medium as a result of the characters being scanned, for example, by a self scanning photocell array. The binary stream can contain multiple lines of a plurality of characters. Each cell of the photocell array is digitalized and transformed into a single data bit which either indicates the presence of character information or background information. The binary data stream is received by the character presence detector and more particularly by the memory located therein. The memory can be any typical storage device; for example, a plurality of shift registers capable of storing a plurality of scans. The shift registers are tapped at intervals equal to the number of data bits within each scan to provide the data bits in a predetermined sequence. Through these taps the shift registers are connected to a plurality of logic devices which are interconnected so as to give an output signal when a binary data bit in one scan and the binary data bit occupying the same position within an adjacent scan both contain character information at the data rate. If this is true for any of the scans contained within the memory, a signal is provided to a storage unit; for example, a plurality of serially connected shift registers. The storage unit provides the output of each of its shift registers to a row pattern unit which when certain criterion are satisfied provides an output signal so indicating. Taps of the plurality of shift registers which as discussed above are spaced apart so as, for example, the output of one cell of a photocell array simultaneously presented as an output of the shift registers. The output of that particular photocell changes from scan to scan depending on what portion of the written medium is focused on to that cell during any particular scan of the photocell array. In other words, each binary bit has a unique position within its particular scan. That position corresponds if the scan represents columns a certain position within the scan represents a row. Each position within the scan from the beginning to the end of the scan becomes in sequence the output of the shift registers at the taps provided. Thus, a portion of a row of the video is as provided as an output of the memory to the set of logic devices, as discussed above. A row pattern network receives the output of the set and logic devices and examines the signals to detect the presence of a character across the scans within the memory. Thus, the row pattern network is in electrical communication with the set of logic devices and responds to the signals received therefrom to locate and determine the center of the character along the rows of the video.

The taps of the shift registers are also connected to other shift registers which are also a part of the memory. Each tap is connected to a plurality of serially connected shift registers which store and transfer at the data rate the data received from its associated tap serially. Each of the plurality of shift registers, one of which is connected to each of the taps, is connected to a plurality of sets of logic devices to provide a circulation of adjacent data bits in a predetermined sequence. These devices are connected so as to indicate when adjacent data bits stored in the shift registers contain character information at the data rate. In any two data bits containing character information, the logic devices associated with each of the plurality of shift registers so indicates to a column pattern network.

The column pattern network receives the output of the plurality of sets and responds thereto to detect the presence of a character along the scans. When both the row pattern network and the column network indicate character presence simultaneously during the interval between the receipt of new data and the data rate, i.e., the center of the character is detected. Thus, the character presence detector shown herein makes its decisions at the data rate. The data bits of the binary stream pass through the memory at the data rate.

In order for the center of the character as determined by the row pattern network and the column pattern network to be locatable at a later time within the data stream, counters are provided. One counter is zeroed at the start of each scan as received by the memory and counts at the data rate each data bit within each scan. The other counter is set to zero when a document detected signal is received or by some other appropriate signal which selects a particular scan as the scan associated with a count of zero. This second counter counts the start of each new scan of data and provides a count relative to the selected scan. This counter, as should be readily apparent to those skilled in the art, should be capable of providing a sufficiently high count to the remainder of the character recognition unit before reaching its maximum count and recycling to zero so that the scan count provided to the remainder of the recognition unit cannot be confused with other scans of data.

DESCRIPTION OF THE PREFERRED EMBODIMENT

Figure 1:
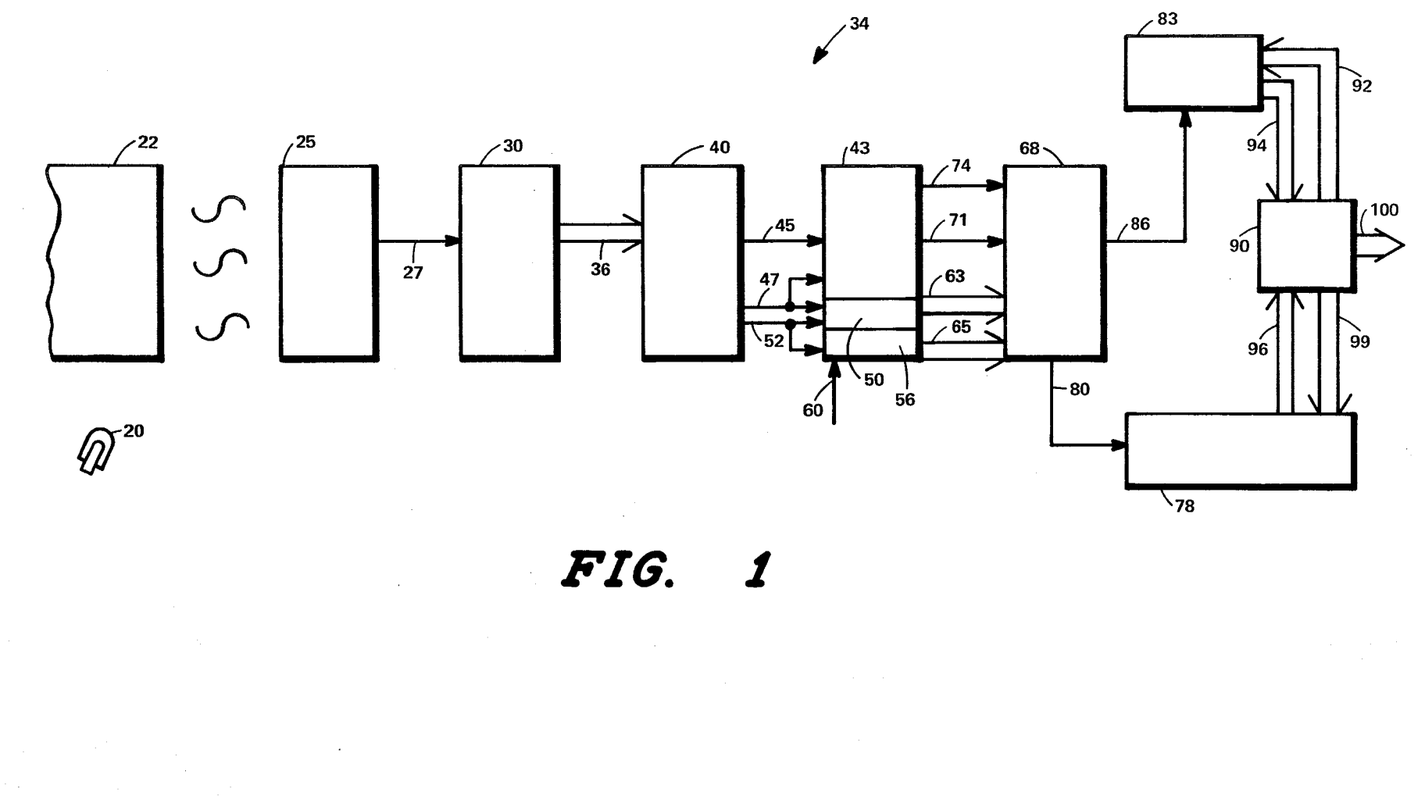
FIG. 1 is a block diagram of a character recognition unit with the character presence detector of the present invention located therein.

With reference to the drawings and in particular to FIG. 1 thereof, a lamp 20 illuminates a written medium 22 which can be, for example, a document being transported by a drive means (not shown). The written medium has several lines of alphanumeric characters disposed thereon which contrast with the background of the written medium. The light reflected from the written medium 22 is focused by a lens (not shown) onto a photosensitive device such as self scanning photocell array 25. Other types of scanning can be utilized with the present invention; for example, a flying spot scanner with the light reflected from the written medium 22 being focused onto a single photo detector such as a photo multiplier.

The photocell array 25 can be of a type known as a linear photocell array (or one dimensional photocell array) with 128 photocells located in a single line perpendicular to the direction of motion of written medium 22. The photocell array 25 is continuously scanned by the means of a multiplexer located on the same chip as the photocells and provides an analog output through line 27 to analog to digital converter 30. During a scan of the photocell array the multiplexer located on the photocell array 25 selects each cell from one end of the array to the other in a predetermined sequence and provides the outputs of the photocells sequentially as a serial output to line 27. The usual timing pulses which occur when a cell is selected by the multiplexer on the same chip as array 25 are also provided as an output to analog to digital converter 30 through lines (not shown). The scan start pulse of the photocell array is also provided to various units within the character recognition system 34 including the converter 30. The timing pulses, which indicate the selection of a new photocell by the multiplexer of the photocell array 25, control the data rate at which the system 34 operates. In other words, the usual timing, reset and other functions of an analog and digital logic circuits are utilized throughout.

The analog to digital converter 30 provides a 4 bit parallel output through multi-line channel 36 to digital filter 40. The 4 bit output is the analog input on line 27 converted to a digital output. Digital filter 40 has a function of determining whether or not the particular 4 bit output for a cell, which ranges from 0000 for white to 1111 for black and the gray levels in between, is either white or black. Various methods can be utilized to determine whether or not a particular gray level is black or white; for example, by setting an arbitrary threshold value above which the 4 bit output is considered black and below which the output is considered white. A particular 4 bit gray level can also be compared to the output of surrounding cells and to its output in adjacent scans to determine whether or not that particular cell during a particular scan is black or white. Adjacent scans are defined as scans of the photocell array 25 which occurred without intervening scans of the array. Combinations of the arbitrary threshold and the comparison of adjacent outputs can also be utilized.

The binary data stream of black/white decisions is provided to character presence detector 43 through line 45. Character presence detector 43 also is provided with a data clock pulse over line 47 which is the data rate of the multiplexer of photocell array 25. In other words, the data clock pulse on line 47 is at the scan rate of the photocells on photocell array 25 and indicates when a new bit of data is present at the output of digital filter 40. The clock pulse at the data rate serves two functions in character presence detector 43. First, these pulses are counted within counter 50 for determining the relative position of the particular data bits being utilized within the character presence detector. The scan start pulse which was initially provided by the multiplexer on array 25 is provided through line 52 to counters 50 and 56. The scan start pulse is synchronized with the pulses on line 47 and the data on line 45 such that the scan start pulse indicates the data representing a scan of the array 25 has begun to be outputted by digital filter 40 onto line 45.

The other counter 56 within character presence detector 43 also receives a document presence signal on line 60 which indicates that a document is being scanned and which resets counter 56 to zero. One function of the scan start pulse on line 52 is to reset counter 50 to zero. The scan start pulses on line 52 are counted by counter 56. The output of counters 50 and 56 is provided on line multi-line channels 63 and 65, respectively, to a line finder 68. When character presence detector 43 indicates on line 71, which is connected to line finder 68, that a center of a character is detected, the line finder 68 senses the outputs of counters 50 and 56 and stores that information to determine and locate lines within the binary data stream. The binary data stream from character presence detector 43 is provided to the line finder 68 through line 74.

The data on line 74 is sequentially identical to the data on line 45. Data clock pulses at the data scan rate and scan start pulses, which are properly delayed are also provided through lines (not shown) to line finder 68. Function of line finder 68 is to locate lines of data, i.e., character centers provided by character detector 43 which are generally disposed along the same position within the scans of data; for example, such as a number of characters disposed about a position such as the fortieth cell addressed by the multiplexer on array 25. Characters having centers which may vary slightly about position 40 corresponding to the fortieth cell addressed within the scan such as from 35 to 45 can be considered to be a part of a line.

Information concerning the line is outputted to a processor 78 through line 80. Line 80 can be a multi-line channel depending on the amount of data to be transferred. Also, the standard clocking pulses i.e., the scan start pulse and the data clock pulse, are provided to processor 78 through lines (not shown). Those clock pulses are also provided to a memory 83 through lines (not shown). The binary data stream is also provided to memory 83 on line 86. The data on line 86 corresponds to the data on lines 45 and 71 and has the same sequence as that data. In other words, the scans are received by the memory 83 in the same order as they are received by character presence detector 43 and each data bit within each scan is provided to memory 83 in the same sequence as received by character presence detector 43.

Memory 83 which can be a RAM type memory is addressed by character recognition unit 90 through multi-line channel 92. The information addressed by the character recongnition unit is provided by memory 83 to the character recognition unit through multi-line channel 94. Multi-line channel 94 can also transfer information concerning the location of various parts of the video stored therein. The function of character recognition unit 90 is controlled by processor 78 through multi-line channel 96. Processor 78 provides the character recognition unit 90 with instructions on where to locate the various lines of data and the location of characters to be recognized within memory 83. In other words, processor 78 provides the information derived by character presence detector 43 and line finder 68 to the character recognition unit 90. Information concerning the operation such as 'recognition complete' signals are provided to processor 78 from character recognition unit 90 through multi-line channel 99. The results of the recognition performed by character recognition unit 90 is provided through mutli-line channel 100 to, for example, a tape unit, central processing unit, etc. Thus, the output on multi-line channel 100 is the binary code which identifies the character resulting from analysis of the outputs of the photocells of array 25 as dictated by the light reflected from the written medium 22 with the characters disposed thereof.

Figure 2:
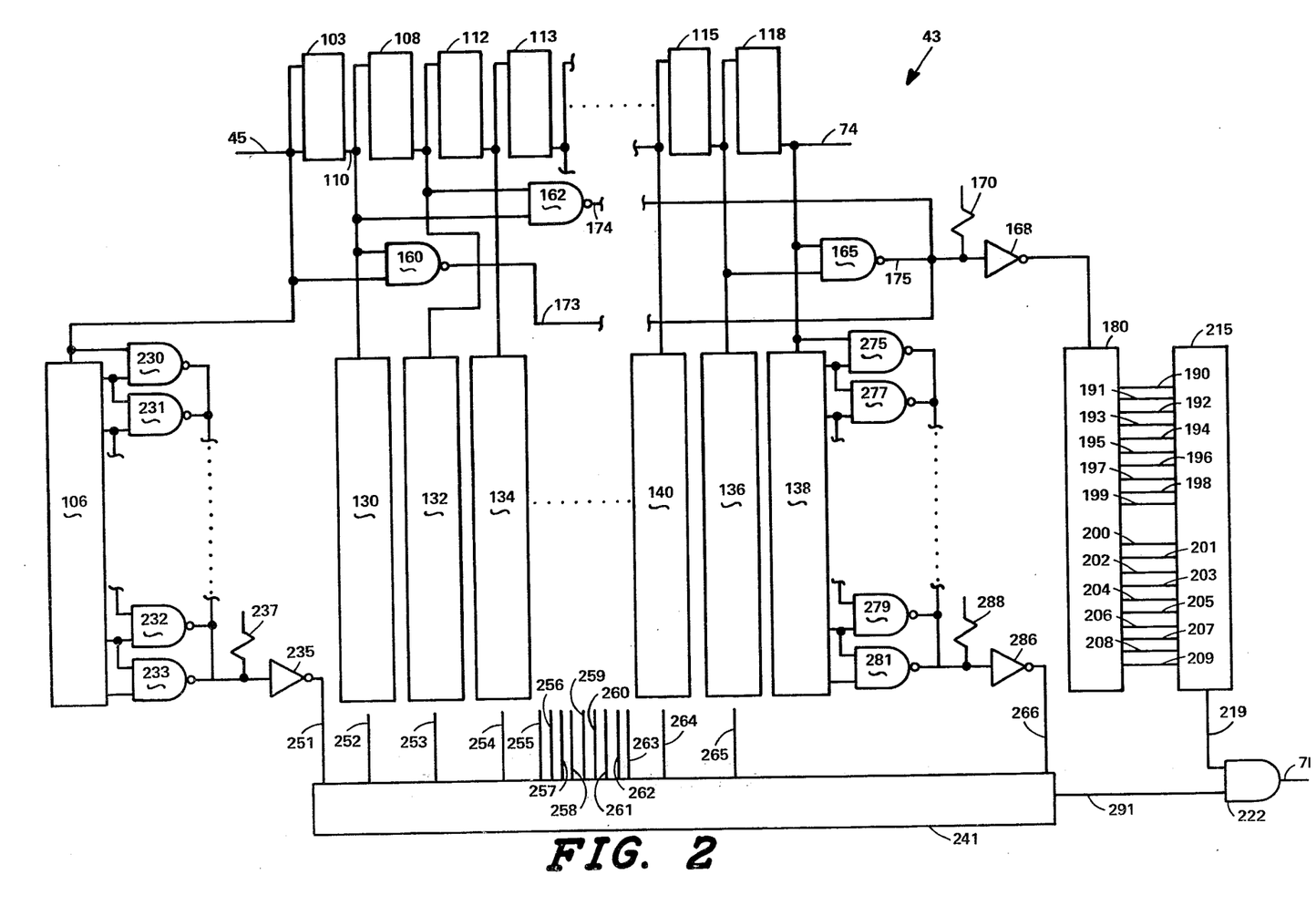
FIG. 2 is a block diagram of a character presence detector as constructed according to the present invention.

As shown in FIG. 2, the character presence detector 43 receives data on line 45. Line 45 is connected to shift registers 103 and 106. Shift register 103 is a plurality of serially connected individual shift registers which are equal in number to the number of data bits in the scan; for example, if there are 128 data bits per scan, which would correspond to 128 photocells in the array 25 (FIG. 1), then register 103 would comprise 128 individual shift registers. The output of shift register 103 is connected to shift register 108 through line 110. Thus shift register 108 receives the output of shift register 103 which is the same data which is present on line 45 but delayed by one scan. Shift register 108 is connected to shift register 112 which is connected to another shift register 113. A plurality of shift registers (not shown) are serially connected between shift registers 113 and 115. Shift register 115 is in turn connected to shift register 118. The output of shift register 118 is connected through line 74 to line finder 68. (Only shift registers 103, 108, 112, 113, 115, and 118 are shown). In the preferred embodiment 15 shift registers are desirable, although the number can vary as dictated by particular design requirements.

The output of shift register 103 is also connected through line 110 to the input of shift register 130. The output of shift registers 108, 112, 115 and 118 is connected to shift registers 132, 134, 136, 138, respectively. In addition a shift register 140 is shown connected to the input of shift register 115. Shift registers 106, 130, 132, 134, 136, 138, and 140 are identical serially connected shift registers which have a plurality of individual shift registers serially connected therein. In the preferred embodiment, these shift registers are twenty individual shift registers long and each of the individual shift registers has an output which is available to be utilized within the character presence detector 43. In the preferred embodiment, the number of shift registers (only shift registers 106, 130, 132, 134, 136, 138, and 140 are shown) comprises a total of 16 similar shift registers. Both the length of the shift registers and the number can be varied as design considerations vary. However, the number of shift registers 106, etc. should be equal to one greater than the number of shift registers 103, etc. for reducing the number of components needed for this system. The shift registers 103, 108, 112, 113, 115, 118, and the other similar shift registers associated therewith, and shift registers 106, 130, 132, 134, 136, 138 and, 140 and the other similar shift registers associated therewith comprise a memory. The data bits can be considered as stored in a matrix which has N scans each scan constituting M data bits, $A_{1,1}, A_{1,2}, \ldots A_{1,M} \ldots A_{N,M}$, which correspond to $B_1, B_2 \ldots B_{MXN}$, respectively, if the data bits are designated serially in the binary stream. The memory can be of several configurations such as a RAM with an appropriate controller selecting the necessary outputs for the remainder of the system.

The outputs of the shift registers 106, 130, 132, 134, 136, 138, and 140 are connected to other portions of the character presence detector 43. These devices could be directly connected to an associated shift register 103, 108, 112, 113, 115, 118, etc. if those shift registers are designed to provide access to each individual shift register therein. Of course, some provision would have to be made for shift register 138 which stores the last twenty data bits which are outputs of shift register 118.

Line 45 is connected to a NAND gate 160 which has its other input connected to the output of shift register 103 through line 110. Line 110 is also connected to an input to NAND gate 162, and the other input of NAND 162 is connected to the output of shift register 108. NAND gate 165 has one input connected to the output of shift register 118 and its other input connected to the output of shift register 115. The outputs of NAND gates 160, 162, and 165 are connected to an inverter 168 and a resistor 170 through lines 173 through 175, respectively. The outputs of all the shift registers (only 103, 108, 112, 113, 115 and 118 are shown) are connected to NAND gates (not shown) in a manner similar to the connection of NAND gates 160, 162, 165 to the outputs of shift registers 103, 108, 115 and 118. A NAND gate (not shown), for example, would be connected to the input and output of register 115, and the output of this NAND gate would be connected to the inverter 168. If both inputs to NAND gate 165 are high, the output goes low which causes the inverter 168 to go high indicating that a particular cell had an output which indicated that the portion of the written medium 22 which is viewed during two adjacent scans by that particular photocell had character information disposed thereon.

If any of the 15 NAND gates (only NAND gates 160, 162, and 165 are shown) goes low, this indicates that for 15 scans of the array 25, at least two of the scans which are consecutive, (i.e., adjacent) the particular photocell represented by the data bits which serve as the inputs to the NAND gates had an output which corresponded to character information. The data is clocked onto line 45 at the same data rate as the photocell array 25 is scanned. The data is moved through the shift registers 103, 108, 112, 113, 115, 118, 130, 132, 106, 134, 136, 138, 140 at the data rate. Because the shift registers 103, 108, 112, 113, 115, 118, (and the other shift registers associated therewith which are not shown) are of a width equal to one scan, the only data which is examined by NAND gates 160, 162, 165 and the other NAND gates associated therewith (not shown) which comprise a row logic means, is from one particular photocell. This is possible because the photocell array is scanning the same sequence during each scan, and, therefore every 128th data bit in the data stream indicates whether the output of that particular photocell indicated the presence or absence of character information. In other words, every 128 bit in the binary data stream is from a particular photocell because that photocell is associated with a particular unique position in each scan of the data.

The output of inverter 168 is connected to the input of storage device 180. Storage device 180 is a plurality of individual shift registers and as shown herein the individual shift registers are connected serially and are 20 in number. The individual shift registers are connected through lines 190 through 209 to a row pattern network 215. Thus, the shift register 180 is located intermediate inverter 168 and row pattern network 215. The NAND gates and inverter 168 form a set of logic devices which signal in accordance with the Boolean equation, $R = A_{o,i} \cdot A_{o+1,i} + A_{o+1,i} \cdot A_{o+2,i} + \ldots A_{q-1,i} \cdot A_{q,i}$, where i, o and q are integers with $q > o$ and i is a certain position within the scans. Row pattern network 215 is discussed in detail here below. The output of row pattern network 215 is connected through line 219 to an AND gate 222. The output of AND gate 222 is connected to line finder 68 through line 71.

Shift register 106 is connected to a set of logic devices which is shown by NAND gates 230 through 233 and inverter 235. NAND gate 230 is connected to the input of shift register 106 and to the output of the first individual shift register contained within shift register 106. The output of NAND gate 230 is connected to inverter 235 and resistor 237. NAND gate 231 receives inputs from the first and second individual shift registers within shift register 106. The output of NAND gate 231 is connected to resistor 237 and inverter 235. A plurality of NAND gates (not shown) are connected to the stages or individual shift registers of shift register 106 in the same manner as NAND gates 230 and 231. NAND gate 232 is connected to the 18th and 19th individual shift registers and NAND gate 233 is connected to the 19th and 20th individual shift registers of shift register 106. Altogether 20 NAND gates (only NAND gates 230, 231, 232, and 233 are shown) are connected to the various individual shift registers of shift register 106 at their inputs and to inverter 235 at their outputs.

If the data bit present at the input of the shift register 106 and the output of the first individual shift register of shift register 106 both containing character information, the output of NAND gate 230 goes low which in turn causes the output of inverter 235 to go high. If, for example, the data bits contained in the 19th and 20th individual shift registers of shift register 106 represent character information, then the output of NAND 233 goes low and the output of inverter 235 goes high. Thus, the high output of inverter 235 indicates that adjacent data bits within the portion of the binary data stream which are stored within shift register 106 are present in its input containing character information. Therefore, the high output of inverter 235 indicates that adjacent data bits within the binary stream, which is sensed by NAND gates 230 through 233 and the other NAND gates (not shown) associated with shift register 106, represent character information. The output of inverter 235 is connected to column pattern network 241 through line 251. The other inputs to column pattern network 241 are provided through lines 252 through 266.

A NAND gate 275 is connected to the input of shift register 138. The other input of NAND gate 277 is connected to the first individual shift register within shift register 138. NAND gate 277 is connected to the first and second individual shift registers within shift register 138. NAND gates 279 and 281 are connected at one of their inputs to the 19th individual shift register of shift register 138. NAND gate 281 is connected at its other input to the 20th individual shift register of shift register 138. The other input of NAND gate 279 is connected to the 18th individual shift register of shift register 138. Sixteen other NAND gates are connected to the various individual shift registers of shift register 138 so that, if character information is contained within adjacent data bits stored in shift register 138, one of those NAND gates or NAND gates 275, 277, 279, or 281 goes low. (Note that one input of NAND gate 275 is connected to the input of shift register 138. The outputs of the 16 NAND gates (not shown) and NAND gates 275, 277, 279, and 281 are connected as inputs to inverter 286 and resistor 288. Inverter 286 performs the same function as inverter 235 associated with the NAND gates connected to shift register 106. The output of inverter 286 is connected through line 266 to column pattern network 241. Thus, NAND gates 275, 277, 279, 281 and the other NAND gates (not shown) associated with shift register 138 and inverter 286 form a set of logic devices which indicate when the Boolean equation $C = B_j \cdot B_{j+1} + B_{j+1} \cdot B_{j+2} + \ldots + B_{j+k-1} \cdot B_{j+k}$, where j and k are integers. Each of the shift registers 130, 132, 134, 136, 138, and 140, and the other nine shift registers located intermediate shift registers 134 and 140 are connected to NAND gates similar to the way in which shift registers 106 and 138 are connected to their associating NAND gates. These NAND gates are connected to an inverter and through the inverter to one of the lines 252 through 265 to column pattern network 241. For example, the set of logic devices associated with shift register 130, 132, 134, and 136, are connected to lines 252, 253, 254, 265, respectively. The set of logic devices associated with shift register 140 has its output connected to line 264.

The shift registers intermediate shift registers 134 and 140 are connected to lines 255 through 263 in such a way that the set of logic devices connected to line 255 are connected to the shift register receiving data from the output of shift register 113. Thus, the devices connected to line 255 receive a scan of data which is one scan earlier than the scan received by the devices connected to line 256 at the data rate. Thus, the devices associated with line 255 receive the newest scan of data while the devices associated with line 263 receive a scan which is nine scans earlier in the binary data stream. Column pattern network 241 is discussed in detail here below. The output of column pattern network 241 is connected through line 291 to AND gate 222.

Figure 3:
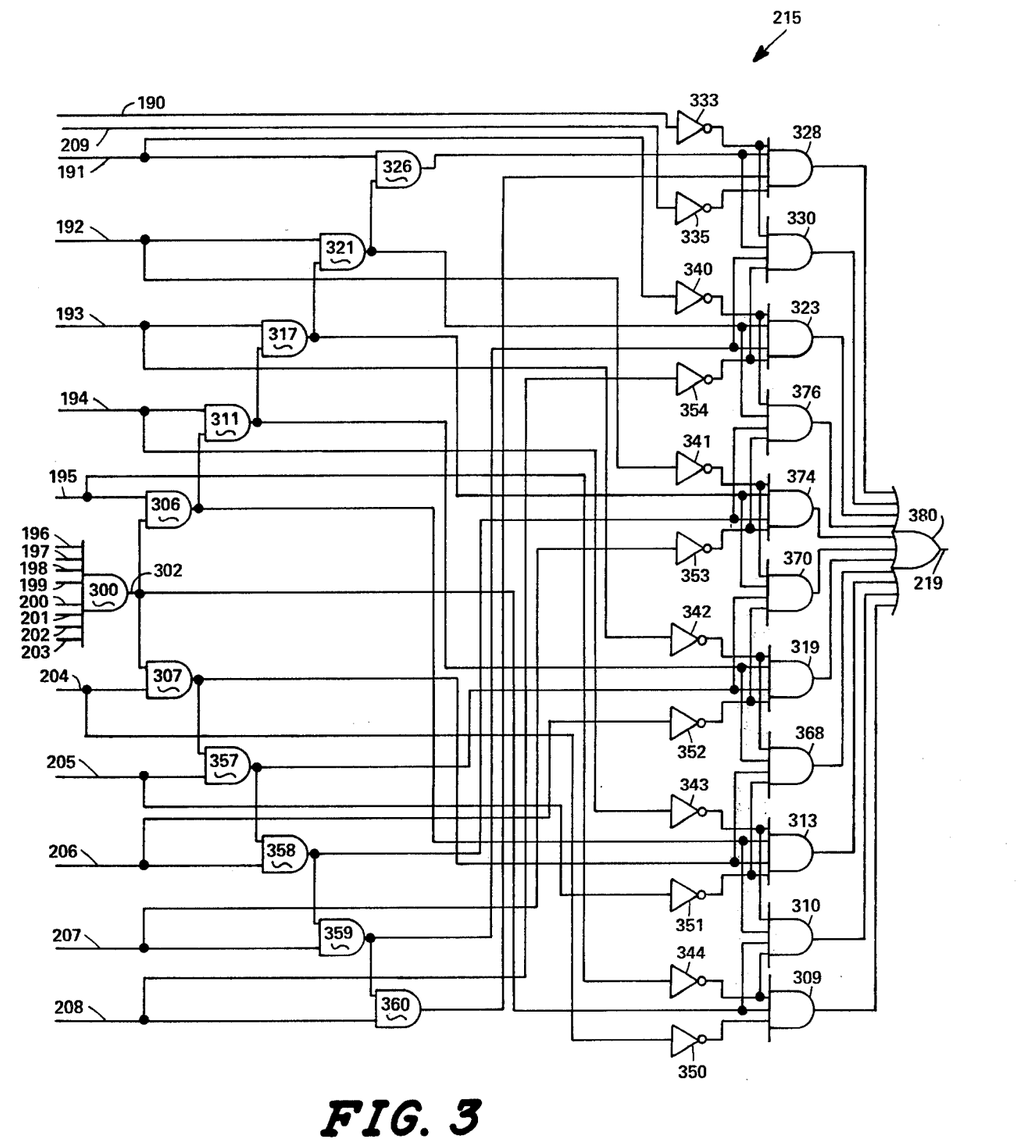
FIG. 3 is a detail logic diagram of a row pattern network as shown in FIG. 2.

The detail logic diagram of row pattern network 215 is shown in FIG. 3. Lines 190 through 209 connect shift register 180 (FIG. 2) to AND gate 300. The output of AND gate 300 is connected through line 302 as an input to AND gates 306, 307, and AND gate 309. The other input to AND gate 306 is from the 6th individual shift register of shift register 180 through line 195. AND gate 307 has its other input connected to line 204. The output of AND gate 306 is connected as an input to AND gates 310, 311, and 313. The other input to AND gate 311 is from shift register 180 through line 194. The output of AND gate 311 is connected as an input to AND gates 308, 317, and 319. The output of AND gate 317 is connected as an input to AND gates 370 and 374.

AND gates 326 and 376 receive the output of AND gate 321 as an input.

AND gates 326 and 376 receive the output of AND gate 321 as an input. AND gates 311, 317, and 321 have inputs from lines 194, 193, and 192, respectively. AND gate 326 has an input connected to line 191. The output of AND gate 326 is connected to AND gate 330 and AND gate 328. Line 190 is connected as an input to inverter 333. Inverter 333 has its output connected as an input to AND gates 328 and 330. Line 209 is connected as an input to inverter 335 which has its output connected to AND gate 328. Lines 191 through 195 are connected to the inputs of inverters 340 through 344. Inverters 350 through 354 have their inputs connected to lines 204 through 208, respectively. Lines 205 through 208 are connected to the inputs of AND gates 357 through 360 respectively.

The output of AND gate 307 is connected as an input to AND gates 357, 368, and 313. The output of AND gate 357 is connected as an input to AND gate 358, AND gate 319, and AND gate 370. The output of AND gate 358 is connected to AND gate 359, AND gate 374, and AND gate 376. AND gate 360 has an input connected to the output of AND gate 359. The other AND gates connected to the output of AND gate 359 are AND gates 323 and 330. The output of AND gate 360 is connected as an input to AND gate 328. The outputs of AND gates 309, 310, 313, 319, 323, 328, 330, 368, 370, 374, and 376 are connected as inputs to OR gate 380.

AND gate 309 has its input connected to inverters 344 and 350 and to AND gate 300 through line 302 as discussed above. AND gate 310 has its inputs from AND gates 300 and 306 (as discussed above) and inverters 343 and 344. AND gate 313 receives inputs from inverters 343 and 351 as well as from AND gates 307 and 306. AND gate 319 is connected to the outputs of inverters 342 and 352 in addition to its inputs from AND gates 357 and 311. The outputs of inverters 352 and 341 are inputs to AND gate 370 in addition to the outputs of AND gate 357 and AND gate 317. The output of inverter 341 is also connected to an input of AND gate 374. The output of inverter 353 is connected to an input of AND gate 374 and an input to AND gate 376. The other inputs to AND gate 374 are from AND gates 317 and 358. The other inputs to AND gate 376 are from AND gates 358 and 321 and from inverter 340. The output of inverter 340 is also connected to an input of AND gate 323 along with the output of inverter 354. The other inputs to AND gate 323 are from AND gates 321 and 359 (as discussed above). Inverter 354 is also connected as an input to AND gate 330 which also has an input from inverter 333. AND gates 326 and 359 are connected as inputs to AND gate 330. Finally, AND gate 328 is connected to inverters 333 and 335 and AND gates 360 and 326. AND gate 368 is connected to the outputs of AND gates 311 and 307 and inverters 342 and 351.

The logic devices comprising row pattern network 215 can be described by the following Boolean equation:

$$(\sum_{g=1}^{g=6} \overline{R}_g \cdot R_{g+1} \cdots R_{s-g} +$$

$$\sum_{g=1}^{g=5} R_g \cdot R_{g+1} \cdots \overline{R}_{s-g-1})$$

where R are the signals produced by inverter 168 and stored in shift register 180 as outputs to lines 190 through 209 with $R_1$ to line 190, $R_2$ to line 191 etc., g and s are integers with $s > g$, and s is a preselected fixed integer of 20 as shown in this particular embodiment and $R_g$ is produced after $R_{g+1}$. This Boolean equation represents one of many possible preselected criterion possible for determining the presence of the character across the scans. The integer, s, represents the number of signals from inverter 168 stored in shift register 180. A decision is made between each data shift at the data rate. With regard to one term of the equation $\overline{R}_4 \cdot R_5 \cdot R_6 \cdot R_7 \cdot R_8 \cdot R_9 \cdot R_{10} \cdot R_{11} \cdot R_{12} \cdot R_{13} \cdot R_{14} \cdot R_{15} \cdot \overline{R}_{16}$, if the outputs of shift register 180 to lines 194 and 205 are low and the outputs of shift register 180 to lines 195 through 204 are high, this term of the equation is satisfied. Since lines 196 through 203 are high, the output of AND gate 300 goes high. This high output is applied to AND gates 306 and 307 which along with the high inputs from lines 204 and 195, respectively, causes both AND gates to go high. These high signals are inputs to AND gate 313. The low signals on lines 194 and 205 causes the output of inverters 343 and 351 to go high. The output of AND gate 368 goes high because all of its inputs are high. The high output of AND gate 368 when applied to OR gate 380 causes the output of OR gate 380 to line 219 to go high.

The row pattern network 215 is designed for two purposes. First, the row pattern network determines the presence of the character as disposed in the rows across the various scans of data in the shift registers 103, 108, 112, 113, 115, 118 (FIG. 2) and the other shift registers associated therewith (not shown). The row pattern network 215 secondly determines the center of the character information disposed across the various scans. To put it another way, row pattern generator 215 locates the scan which forms the center of the character disposed across several scans of the binary stream. In order to perform these functions, a particular equation (or criterion) has been utilized as shown herein. Modifications and other row pattern equations and criterion can be utilized to conform to other design requirements and can be modified to accommodate various types of alphanumeric characters and various patterns.

Figure 4:
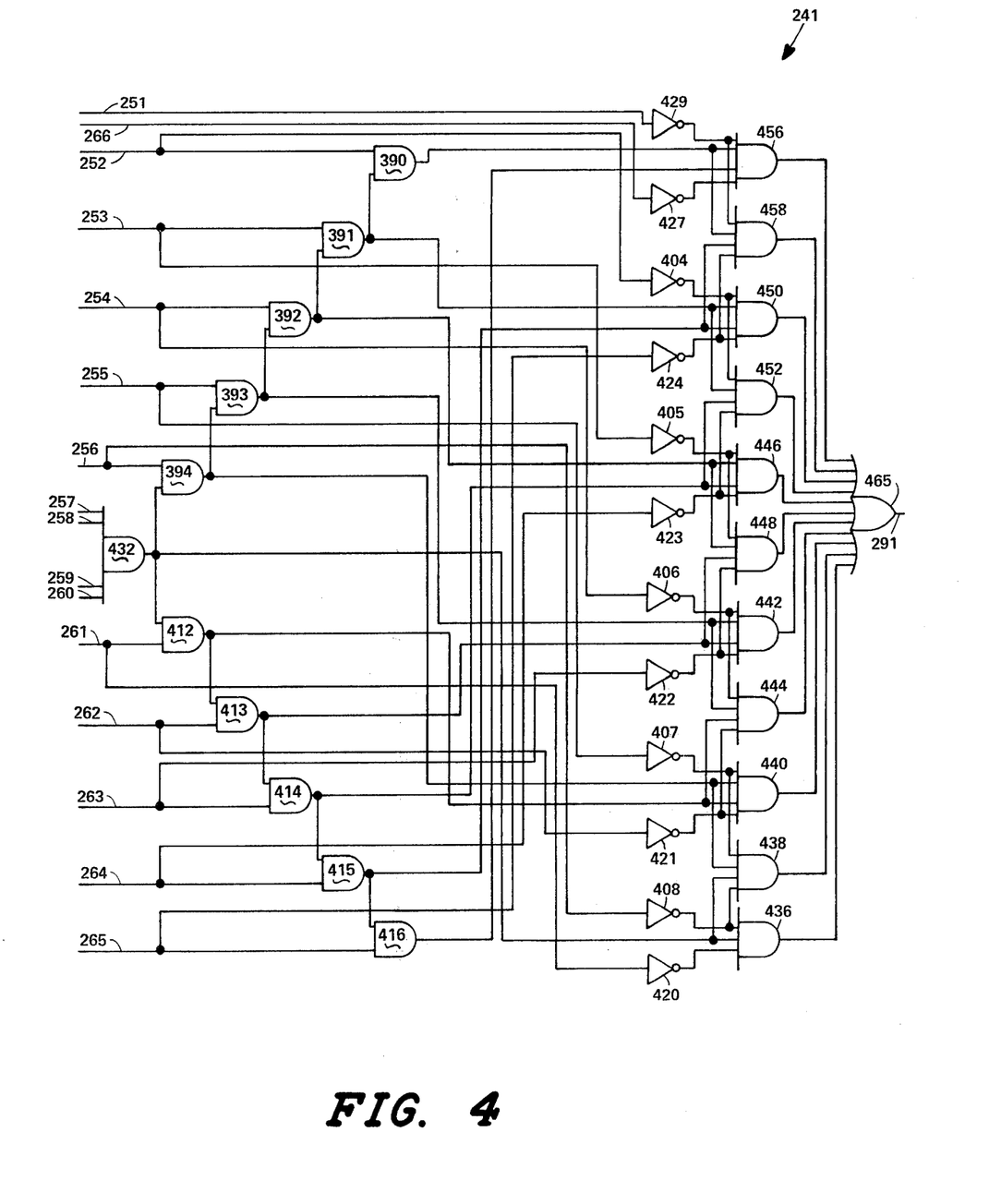
FIG. 4 is a detailed logic diagram of a column pattern network shown in FIG. 2.

The column pattern network 241 is shown in detail in FIG. 4. Lines 252 through 256 (which are discussed above) serve as inputs to AND gates 390 through 394, respectively. Lines 252 through 256 are also connected to inverters 404 through 408. Lines 261 through 265 are connected as inputs to AND gates 412 through 416, respectively. Lines 261 through 265 are also connected as inputs to inverters 420 through 424, respectively, and lines 266 and 251 are connected as inputs to inverters 427 and 429, respectively. The remaining lines 257 through 260 are connected as inputs to AND gate 432. The output of AND gate 432 is connected as an input to AND gates 412, 394, 436 and 438. The output of AND gate 394 is connected to an input of AND gates 393, 438 and 440. AND gate 393 is connected to inputs of AND gates 392, 442, and 444. The output of AND gate 392 is connected to AND gates 391, 446 and 448. AND gate 391 is connected to an input of AND gates 390, 450 and 452. The output of AND gate 490 is connected as an input of AND gates 456 and 458.

AND gate 412 has its output connected to AND gate 440, 444, and 413. AND gate 413 has its output connected to AND gate 414 and AND gates 442 and 448. AND gate 414 is connected to AND gates 415, 446 and 452. AND gates 450, 458, and 416 have the output of AND gate 415 connected as an input thereto. AND gate 416 is connected as an input to AND gate 456. The output of inverters 429 and 427 are connected to AND gate 456.

The output of inverter 429 is connected to AND gate 458 which also receives the output from inverter 424 ad an input. AND gate 450 receives the outputs of inverters 404 and 424. AND gate 452 has two of its inputs connected to inverters 404 and 423. The outputs of inverters 404 and 423 are connected to AND gates 446. The output of inverter 405 is also connected to an input of AND gate 448 which also receives the output of inverter 422 as an input. Inverters 406 and 422 are connected as inputs to AND gate 442. AND gate 444 has inverter 406 connected as an input. Inverter 421 has its output connected as an input to AND gates 444 and 440. Both AND gates 440 and 438 receive the output of inverter 407 as an input. Inverter 408 has its output connected to AND gate 436 and AND gate 438. The output of inverter 420 is connected to an input of AND gate 436. The outputs of AND gates 436, 438, 440, 444, 442, 446, 448, 450, 452, 456, and 458 have their outputs connected to OR gate 465. The output of OR gate 465 is connected to AND gate 222 (FIG. 2) through line 291.

It should be noted that the row pattern network 215 and the column pattern network 241 are identical except that the lines 198, 199, 200 and 201 (FIG. 3) have no counterpart in the column pattern network. The function of the column pattern network 241 is to detect the center of the character information in shift registers 106, 130, 132, 134, 136, 138, and 140 and the other shift registers (not shown) associated therewith. The column pattern network 241 serves to detect the character disposed along the scans while the row pattern network 215 functions to detect the presence of character information across (or between) the scans. The logic devices comprising column pattern network 215 can be described by the following Boolean equation:

$$(\sum_{h=1}^{h=6} \bar{C}_h \cdot C_{h+1} \cdots \bar{C}_{p-h}) + (\sum_{h=1}^{h=5} \bar{C}_h \cdot C_{h+1} \cdots \bar{C}_{p-h-1})$$

where C are the signals produced by the sets of logic devices to lines 251 through 266 with $C_1$ from line 251, $C_2$ from line 252 etc., h and p are integers with $p > h$. This Boolean equation represents one of many preselected criterion possible for determing the presence of the character along the scans. The integer P is a preselected number, 16, in this embodiment which corresponds to the number of shift registers (only 106, 130, 132, 134, 136, 138, and 140) and associated logic devices (only those associated with shift register 106 and 138, as shown). A decision is made between each data shift at the data rate. This Boolean equation is only one of many criterion which can be utilized for the column pattern network. The symbol Σ is utilized herein as an OR function.

When both lines 219 and 291 from the pattern network 215 and 241, respectively, are high, the output of AND gate 222 (FIG. 2) to line 71 goes high signifying to line finder 68 that the information in counters 50 and 56 indicating the presence and the center of a character within the binary data stream.

In summary, a plurality of serial shift registers having a number of stages (i.e., individual shift registers) equal to the width of one scan of a photocell array receive a binary data stream. Each bit of the binary data stream indicates whether a particular photocell array represented by that position within the scan had an output which indicated character information or background information. A logic means is connected to the output of each of the shift registers and to the input of the first shift register. The logic means signals when data bits occupying a certain position in adjacent scans contain character information. A plurality of shift registers are utilized to store a preselected number of data bits which are adjacent with the binary data stream. All of these shift registers except one are connected to the outputs of the shift registers storing a scan width, and the other is connected to the input of the first shift register storing a scan width. Each of this plurality of shift registers has a set of logic devices associated therewith. Each set of logic devices indicates when adjacent data bits within the binary stream stored in its associated shift register contain character information. The outputs of these sets of logic devices are connected to a column pattern network which indicates the presence of character information and further when that information is centered. The output of the logic means is inputted to a single shift register which has outputs to a row pattern network. The row pattern network determines the location of the center of the character information. Counters within the character presence detector count the scans received by the serial shift registers from a selected scan and each data bit received from the beginning of each scan. The character presence detector shown herein makes determination of character presence and character center at the data rate and for each bit of data. The outer counter indicates the number of the scan during which the centering of a character was detected.

Having described the invention in connection with certain specific embodiments thereof, it is understood that other and further modifications may now suggest themselves to those skilled in the art and it is intended to cover such modifications as fall within the scope of the appended claims.

What is claimed is:

1. A character presence detector for detecting the center of a character within a binary data stream, which is divided into scans, of data bits representing background and character information and passing through a memory capable of storing a plurality of said scans, comprising:
   a first logic means connected to said memory for producing first signals when data bits occupying the same position within adjacent scans of said stream contain character information;
   a first pattern network responsive to said first signals from said first logic means for signalling when said first signals meet preselected criterion detecting the center of said character across said scans;
   a second logic means connected to said memory for producing second signals when adjacent data bits within said data stream contain character information; and a second pattern network responsive to said second signals from said second logic means for signalling when said second signals meet preselected criterion detecting the center of said character along said scans.

2. Character presence detector as set forth in claim 1 including means operatively connected to said first and second pattern networks for signalling when both said first and second pattern networks detect the center of said character.

3. Character presence detector as set forth in claim 1 including a scan counter counting scans received by said memory relative to a selected scan.

4. Character presence detector as set forth in claim 1 including a counter counting said data bits received by said memory within each scan.

5. Character presence detector as set forth in claim 1 including a storage device located intermediate said first logic means and said first pattern network for providing a preselected number of first signals simultaneously to said first pattern network.

6. A character presence detector for locating a character within a binary data stream, said stream constituting a plurality of scans, each data bit of said scans representing background and character information and being located in a unique position within its particular scan, comprising:
  a. a memory receiving said data stream,
  b. a plurality of logic devices operatively connected to said memory for receiving one data bit from a plurality of consecutive scans, each data bit of said scan being received by said logic devices in a predetermined sequence as said one data bit, said plurality of logic devices producing a first signal when the one data bit of adjacent scans represent character information,
  c. a plurality of sets of logic devices operatively connected to said memory means, each set of logic devices receiving a preselected number of data bits which represent adjacent background and character information within said data stream and signalling at outputs thereof when adjacent data bits within said preselected number contain character information, each data bit of said stream being circulated in a predetermined sequence through each position within said preselected number,
  d. a first pattern network in electrical communication with said plurality of logic devices for receiving said first signals, said first pattern network for determining character presence between said scans by examining a plurality of said first signals; and
  e. a second pattern network connected to each of said sets of logic devices for determining character presence along said scans by examining the outputs thereof.

7. Character presence detector as set forth in claim 6 including a scan counter counting scans received by said memory relative to a selected scan.

8. Character presence detector as set forth in claim 6 including a counter counting said data bits received by said memory within each scan.

9. Character presence detector as set forth in claim 6 including logic means operatively connected to said first and second pattern networks for signalling when both simultaneously determine character presence.

10. Character presence detector as set forth in claim 6 including a storage device located intermediate said plurality of logic devices and said first pattern network for providing a preselected number of first signals simultaneously to said first pattern network.

11. Character presence detector as set forth in claim 6 wherein said first pattern network determines character presence in accordance with the Boolean formula:

$$(\sum_{g=1}^{g=6} \overline{R}_g \cdot R_{g+1} R_{g+2} \cdots \overline{R}_{s-g}) +$$

$$(\sum_{g=1}^{g=5} \overline{R}_g \cdot R_{g+1} \cdot R_{g+2} \cdots \overline{R}_{s-g-s})$$

g and s are integers, s > g, s is a preselected fixed integer and R is said first pattern signal with $R_g$ produced after $R_{g+1}$.

12. Character presence detector as set forth in claim 6 wherein said second pattern network determines character presence in accordance with the Boolean formula:

$$(\sum_{h=1}^{h=6} \overline{C}_h \cdot C_{h+1} \cdot C_{h+2} \cdots \overline{C}_{p-h}) +$$

$$(\sum_{h=1}^{h=5} \overline{C}_h \cdot C_{h+1} \cdot C_{h+2} \cdots \overline{C}_{p-h-1})$$

where C is the output of one set of said plurality of sets and $C_h$ is produced from data bits received by said memory prior to data bits utilized to produce $C_{h+1}$, h and p are integers, fixed p > h, and p is a preselected fixed integer.

13. Character presence detector as set forth in claim 1 including a counter counting said data bits as received by said memory within the scan thereof.

14. A character presence detector for locating the center of a character within a binary stream of data bits divided into scans, each data bit representing background and character information and occupying a unique position within its scan, said stream passing through a memory at a data rate, said memory storing several of said scans and providing selected data bits as outputs at the data rate, comprising:
  a. a first logic means connected to said memory for receiving one data bit from a certain position within each scan, all positions of said scan being selected as said certain position in a predetermined sequence at the data rate, said first logic means signalling at the data rate when said one data bit of one scan and said one data bit of another scan adjacent to said one scan within said stream contain character information
  b. a first pattern network responsive to said first logic means for signalling at the data rate when output of said first logic means meet one set of preselected criterion,
  c. a second logic means connected to said memory for receiving said one data bit and a predetermined number of data bits adjacent to said one data bit within said stream simultaneously at the data rate, said second logic means signalling at the data rate when adjacent data bits received contain character information;
  d. a second pattern network responsive to said second logic means for signalling at the data rate when outputs of said second logic means meet another set of preselected criterion, and
  e. a means operatively connected to said first and second pattern networks for signalling when both said one set and said another set of criterion are met to detect the center of said character at the data rate.

15. Character presence detector as set forth in claim 14 including a scan counter counting scans received by said memory relative to a selected scan.

16. Character presence detector as set forth in claim 14 including a counter counting said data bits received by said memory within each scan.

17. Character presence detector as set forth in claim 14 including a storage means located intermediate said first logic means and said first pattern network for providing a preselected number of first signals simultaneously to said first pattern means.

18. Character presence detector as set forth in claim 14 wherein said first logic means also receives at the data rate a certain data bit of said stream as said memory receives said certain data bit, said certain data bit occupying said certain position within its scan.

19. Character presence detector as set forth in claim 14 wherein said second logic means receives at the data rate a certain data bit of said stream as said memory receives said certain bit.

20. A character presence detector for detecting characters within a binary data stream divided into a plurality of scans constituting a plurality (M) data bits, each data bit of one scan of said scans occupying a unique position within said scan, said data bits representing background and character information, comprising:

a. a memory receiving said stream for storing said data bits of a plurality (N) of scans ($A_{1,1}, A_{1,2} \ldots A_{1,M} \ldots A_{N,M}$) corresponding to $B_1, B_2 \ldots B_{M \times N}$, respectively;

b. a first logic means coupled to said memory for receiving selected data bits $A_{o,i} \ldots A_{q,i}$ to produce a row signal (R) at an output in accordance with the Boolean formula:

$$R = A_{o,i} \cdot A_{o+1,i} + A_{o+1,i} \cdot A_{o+2,i} + \ldots A_{q-1,i} \cdot A_{q,i}$$

c. a storage device receiving the row signals R from said first logic means for storing as outputs said row signals ($R_1, R_2 \ldots R_s$ for positions within the scans i through i+s) in sequence;

d. a row pattern network connected to said storage device to produce a row pattern signal in accordance with the Boolean formula:

Row pattern signal =

$$(\sum_{g=1}^{g=6} \overline{R}_g \cdot R_{g+1} \cdot R_{g+2} \cdots \overline{R}_{s-g}) +$$

$$(\sum_{g=1}^{g=5} \overline{R}_g \cdot R_{g+1} \cdot R_{g+2} \cdots \overline{R}_{s-g-1})$$

e. a plurality of second logic means (p) coupled to said memory, each second logic means receiving selected data bits $B_j, B_{j+i} \ldots B_{j+k}$, where j for one of said second logic means is equal to j+M for another of said second logic means, to produce a column signal C at an output in accordance with the Boolean formula:

$$C = B_j \cdot B_{j+1} + B_{j+1} \cdot B_{j+2} \ldots + B_{j+k-1} \cdot B_{j+k}$$

f. a column pattern network connected to said plurality of second logic means to receive said column signals ($C_1, C_2, \ldots C_p$), said column pattern network producing a column pattern signal in accordance with the Boolean formula:

Column Pattern signal =

$$(\sum_{h=1}^{h=6} \overline{C}_h \cdot C_{h+1} \cdot C_{h+2} \cdots \overline{C}_{p-h}) +$$

$$(\sum_{h=1}^{h=5} \overline{C}_h \cdot C_{h+1} \cdot C_{h+2} \cdots \overline{C}_{p-h-1}),$$

m, n, o, i, g, s, j, k, h, p and q are integers, o > q, s > g, p > h, and $C_1$, produced from data bits having a $B_j$ number lower than the data bits utilized to produce $C_2$.

21. Character presence detector as set forth in claim 20 wherein said data bits are received by said memory at a data rate and said row pattern network and said column pattern network determine said row and column pattern signals at the data rate.

22. Character presence detector as set forth in claim 20 including means responsive to said row pattern signal and said column pattern signal for signalling when said row and column pattern network simultaneously detect the center of said character.

23. Character presence detector as set forth in claim 20 including a scan counter counting scans as received by said memory relative to a selected scan.

* * * * *